United States Patent [19]

Ito

[11] Patent Number: 5,513,273
[45] Date of Patent: Apr. 30, 1996

[54] METHOD FOR OBTAINING INFORMATION ABOUT INTERSTITIAL PATTERNS OF THE LUNGS

[75] Inventor: Wataru Ito, Kanagawa, Japan

[73] Assignee: Fuji Photo Film Co., Ltd., Kanagawa, Japan

[21] Appl. No.: 219,431

[22] Filed: Mar. 17, 1994

[30]  Foreign Application Priority Data

Mar. 18, 1993  [JP]  Japan .................................. 5-057592
Mar. 18, 1993  [JP]  Japan .................................. 5-057593

[51] Int. Cl.$^6$ ..................................................... G06T 7/00
[52] U.S. Cl. ........................................... 382/132; 382/248
[58] Field of Search ................................ 382/6, 56, 131, 382/132, 248; 364/413.13, 413.22, 413.19; 348/77, 398; 358/426

[56]  References Cited

U.S. PATENT DOCUMENTS 5,247,934  9/1993  Wehrli et al. ...................... 364/413.13
5,343,390  8/1994  Doi et al. ..................................... 382/6

FOREIGN PATENT DOCUMENTS 1125675  5/1989  Japan .............................. G06F 15/62

OTHER PUBLICATIONS

Laine et al. "Wavelet Processing Techniques for Digital Mammography," Proc. SPIE vol. 1808, Visualization in Biomedical Computing 1992, Oct. 1992, pp. 610–624.
Braniuk et al. "New Dimensions in Wavelet Analysis" ICASSP–92 vol. 5, Mar. 1992, pp. 137–140.
Simoncelli et al. "Shiftable Multiscale Transforms" IEEE Trans. Info. Theory vol. 38, No. 2, pt 2, Mar. 1992, pp. 587–607.
Manjunath, "Gaber Wavelet Transform and Application to Problems in Early Vision" 26th Asilomer Conf. on Sig. Sys. Comp., vol. 2, Oct. 1992, pp. 796–800.
Peyrin et al. "Multiscale Reconstruction of Tomographic Images" Proc. IEEE–SP Inf. Symp Time–Freq and Time–Scale Analysis, Oct. 1992, pp. 219–222.
J. Jogoe & K. Paton, "Reading chest radiographs for pneumoconiosis by computer," 1975, 32, pp. 267–272.
R. Tully et al., "Towards Computer Analysis of Pulmonary Infiltration," Jul.–Aug., 1978, vol. 13, pp. 298–305.
R. Sutton & E. Hall, "Texture Measures for Automatic Classification of Pulmonary Disease," IEEE Transactions on Computers, vol. C–21, No. 7, Jul. 1972.
T. Ishida et al., "Spectrum Analysis of Trabecular Pattern," Magazine of the Japan Society of Medical Imaging and Information Sciences, vol. 9, No. 1 (1992), pp. 32–40.
"Wavelets and Signal Processing", (Olivier Rioul and Martin Vetterli, IEEE SP Magazine, pp. 14–38, Oct. 1991).
"Zero–Crossings of Wavelet Transform" (Stephane Mallat, IEEE Transactions on Information Theory vol. 37, No. 4, pp. 1019–1033, Jul. 1991).
"Spectral Analysis of Bone Trabecular Image—Fundamental Experiments and Simulation" (Takigawa, et al., the Magazine of the Japanese Society of Radiological Technology, 1990, 9.10, pp. 1659–1669).

*Primary Examiner*—Joseph Mancuso
*Assistant Examiner*—Jon Chang
*Attorney, Agent, or Firm*—Sughrue, Mion, Zinn, Macpeak & Seas

[57]  ABSTRACT

For each picture element in a radiation image of the lungs, a basic Wavelet function is rotated on the radiation image, a degree of contraction of the basic Wavelet function is changed within a predetermined range, and Wavelet transformation is thereby carried out on the image signal, values of a Wavelet transformation factor being thereby calculated. For each value of the degree of contraction, a calculation is made to find a temporary representative value of the values of the Wavelet transformation factor, which have been obtained for each picture element when the degree of contraction was fixed at a predetermined value and the basic Wavelet function was thereby rotated on the radiation image. For each picture element, a representative value is determined from the temporary representative values, which have been calculated for the values of the degree of contraction. Interstitial patterns of the lungs are then rated in accordance with the representative value and the value of the degree of contraction, which was employed in the Wavelet transformation when the representative value was determined.

17 Claims, 8 Drawing Sheets

METHOD FOR OBTAINING INFORMATION ABOUT INTERSTITIAL PATTERNS OF THE LUNGS

BACKGROUND OF THE INVENTION

1. Field of the Invention

This invention relates to a method for obtaining information about interstitial patterns of the lungs, which information is to be utilized in making a diagnosis of the lung tissues. This invention also relates to a method for obtaining information about density of trabeculae of a bone of a human body, or the like, which information is to be utilized in making a diagnosis of an osteoporosis.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, the X-ray image is read out from the X-ray film and converted into an electric signal (i.e., an image signal), and the image signal is processed and then used for reproducing the X-ray image as a visible image on a photocopy, or the like. In this manner, a visible image having good image quality with high contrast, high sharpness, high graininess, or the like, can be reproduced.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the radiation image recording and reproducing systems wherein recording media, such as X-ray film or stimulable phosphor sheets, are used, various kinds of image processings are ordinarily carried out on the detected image signal such that a visible image may be reproduced which has good image quality and can serve as an effective tool in, particularly, the efficient and accurate diagnosis of an illness.

Also, with the radiation image recording and reproducing systems wherein recording media, such as X-ray film or stimulable phosphor sheets, are used, a radiation image of the chest of a human body is obtained and utilized in making a diagnosis of a disease of the lungs of the human body. Specifically, image signal components representing the image patterns of the lungs are sampled from the image signal representing the chest image. Also, the position of a region of interest is determined, and the state of a disease of the lungs in the region of interest is investigated.

Of the diseases of the lungs of human bodies, which diseases are thus found, interstitial diseases, i.e. interstitial abnormal states in the ventricles of the lungs due to accumulation of liquids or protein substances, occur most frequently. Examinations of the interstitial diseases of the lungs reach 40% of the X-ray examinations carried out in hospitals in the United States of America. For example, it has been reported that 22% of the abnormal states of the lungs found with the recording of X-ray images of the chests in the Medical Center of Chicago University are due to interstitial abnormal states.

The rating of interstitial diseases utilizing the X-ray photographs of the chests is the most difficult technique in the radiotherapeutics. This is because various patterns and complicated displacements are encountered in the interstitial diseases, because the relationship between radiological findings and pathological findings has not yet been established, and because the terms used in order to express X-ray image patterns have not yet been defined clearly and vary for different experts in the radiology. Therefore, the manner, in which interstitial patterns of the lungs are rated, vary for different persons, organizations, and the like. Also, even if the interstitial patterns of the lungs are rated by a single person, the results of the rating will vary for different time and circumstances. Accordingly, accurate diagnoses of interstitial diseases of the lungs could not be made in the past.

In view of the above circumstances, various methods have been proposed wherein interstitial patterns of the lungs are quantitatively determined such that the interstitial patterns can be rated objectively. For example, a method for rating the interstitial patterns of the lungs in accordance with statistical properties of a density distribution in an X-ray image has been proposed by Sutton in "IEEE Transactions on Computers," Vol. C-21, No. 7, July 1972. Also, a method for obtaining power spectra of the lung tissues by use of engineering Fourier transformation and discriminating between the normal lungs and the lungs affected by interstitial diseases has been proposed by Tully, et al. in "Investigative Radiology," July–August, 1978, Vol. 13, pp. 298–305. Further, a method, wherein tissue patterns are encoded in accordance with the directions of gray level gradient vectors, which are determined by carrying out a sampling operation on an X-ray photograph of the chest at 1.2 mm sampling intervals, such that the severity of a pneumoconiosis may be investigated, has been proposed by Jagoe, et al in "British Journal of Industrial Medicine," 1975, 32, pp. 267–272.

However, the proposed methods have the problems in that, in cases where the contrast of the patterns due to an interstitial disease is low, a small change in density on the X-ray photograph is lost, and therefore an accurate diagnosis of the interstitial disease of the lungs cannot be made. Such that these problems may be eliminated, a novel method has been proposed in Japanese Unexamined Patent Publication No. 1(1989)-125675. The proposed method comprises the steps of setting a region of interest on a chest image, removing image signal components, which represent the background information, from the image signal components corresponding to the region of interest, processing the image signal components, which are now free of the background information, with a spectral analysis, and thereby automatically detecting and assaying the interstitial patterns. With the proposed method, the coarseness or fineness of a texture can be expressed by the level and the root-mean-square value (rms value) of the first-order moment of a power spectrum obtained from the spectral analysis. Therefore, the state of an interstitial disease of the lungs can be expressed quantitatively.

However, with the method proposed in Japanese Unexamined Patent Publication No. 1(1989)-125675, the region having a predetermined range is set on a radiation image, and the mean-level spectrum in the predetermined range is obtained. Therefore, of the information representing the radiation image, only the information corresponding to the predetermined range can be obtained. Accordingly, with the proposed method, local spectral analyses of interstitial patterns of the lungs cannot be carried out. Also, with the proposed method wherein the spectral analysis is carried out, the region is set manually. Therefore, the problems often occur in that the region is set at an incorrect location. In such cases, accurate information about the interstitial patterns of the lungs cannot be obtained, and the severity of a disease of the lung fields cannot be found accurately. Further, with the proposed method wherein the background information must be removed from the image signal, the calculation time cannot be kept short.

Recently, with the rapid increase in the number of aged persons, osteoporosis has become a medical and social important problem. It has been indicated that the early detection and early diagnosis are of great importance in osteoporosis as in various other diseases. In order for the osteoporosis to be detected early, it is necessary to make a system, with which examinations of a large number of persons can be carried out easily and accurately such that the bodily and economical burdens to the persons may be kept as light as possible.

Figure 10A:
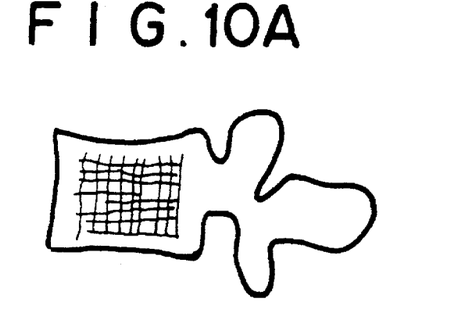
FIG. 10A is a schematic view showing an X-ray image of a normal vertebral body.
Figure 10B:
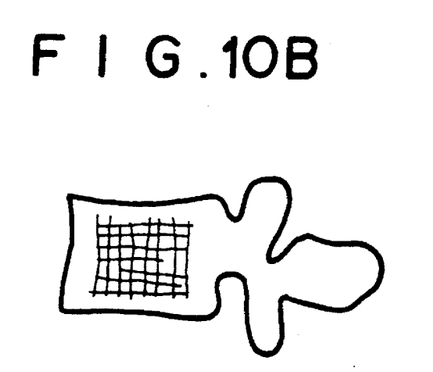
FIGS. 10B, 10C, 10D, and 10E are schematic views showing X-ray images of the vertebral bodies having the osteoporosis in its various stages.
Figure 10C:
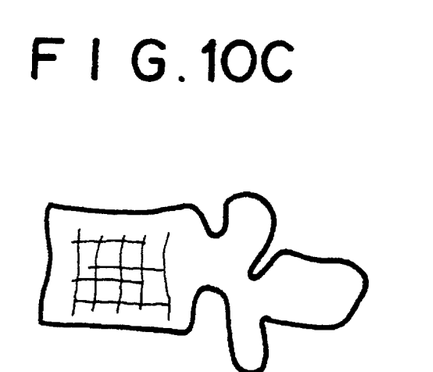
Figure 10D:
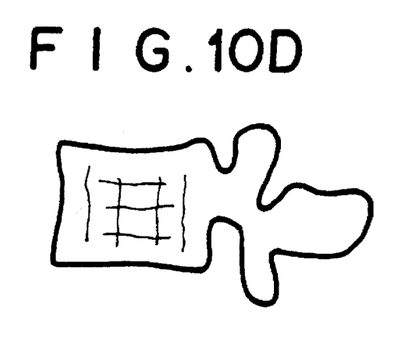
Figure 10E:
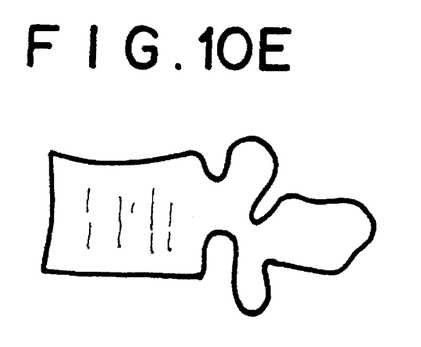

A conventional method for making a diagnosis of the osteoporosis will be described hereinbelow. The conventional method is referred to as the Jidai's classification method. With the conventional method, the severity of the osteoporosis is classified as shown in FIGS. 10A, 10B, 10C, 10D, and 10E in accordance with the impressions which a physician received during observation of, primarily, the trabeculae of a vertebral bone or the density of the image pattern of the vertebral bone. Specifically, FIG. 10A shows an X-ray image of a normal vertebral body, which has dense longitudinal and transverse bone trabecula patterns. FIG. 10B shows an X-ray image of the vertebral body having osteoporosis in its initial stage, in which the image density of the bone is lower as a whole than the image density of the X-ray image shown in FIG. 10A, and in which the patterns of the trabeculae of the bone are thinner and smaller than those shown in FIG. 10A. FIGS. 10C, 10D, and 10E respectively show X-ray images of the vertebral bodies having the osteoporosis in its stages of degree I, degree II, and degree III. As the degree of the osteoporosis becomes higher, the densities of the bone trabeculae in the longitudinal and transverse directions become lower. In this manner, the abnormal states in the images of the trabeculae of the bones are rated with four ranks, i.e. the initial stage, degree I, degree II, and degree III. However, with this method for making a diagnosis of osteoporosis, which relies upon the physician's subjective point of view, the state of the trabeculae of the bone cannot be ascertained quantitatively.

In view of the above circumstances, a method has been proposed, wherein an image signal representing a radiation image of a bone is subjected to spectral analysis utilizing the fast Fourier transform (FFT) and the maximum entropy method (MEM), and the patterns of trabeculae of the bone are numerically expressed with a peak spatial frequency and a power spectrum value. Such a method is described in, for example, "Spectral Analysis of Bone Trabecula Image— Fundamental Experiments and Simulation," by Takigawa, et al , the Magazine of the Japanese Society of Radiological Technology, 1990, 9.10, pp. 1659–1669. Also, a method has been proposed, wherein a power spectrum of a bone image is obtained, and information about the density of trabeculae of the bone is analyzed in accordance with the RMS value (the amount of fluctuation in image density) and the first-order moment (the coarseness and fineness of the image), which are obtained from the power spectrum. Such a method is described in, for example, "Spectral Analysis of Trabecular Pattern," the Magazine Vol. 9, No. 1 (1992), pp. 32–40.

With the aforesaid methods utilizing the spectral analyses, errors in making diagnoses of the osteoporosis can be prevented from occurring due to dependence upon the physician's subjective point of view, and the information about the density of a bone, particularly the bone trabeculae, can be obtained quantitatively.

However, with the aforesaid methods utilizing the spectral analyses, a region of a predetermined range is set on the radiation image, and the mean-level spectrum in the predetermined range is obtained. Therefore, of the information representing the radiation image, only the information corresponding to the predetermined range can be obtained. Accordingly, with the aforesaid methods utilizing the spectral analyses, local spectral analyses of bone images cannot be carried out. Also, with the aforesaid methods utilizing the spectral analyses, wherein the spectral analyses are carried out, the region is set manually. Therefore, the problems often occur in that the region is set at an incorrect location. In such cases, accurate information about the density of the trabeculae of the bone cannot be obtained.

SUMMARY OF THE INVENTION

The primary object of the present invention is to provide a method for obtaining information about interstitial patterns of the lungs, wherein a predetermined region need not be set in a lung image, and local information about the interstitial patterns of the lungs can be obtained quickly and accurately from the lung image.

Another object of the present invention is to provide a method for obtaining information about density of trabeculae of a bone, wherein a predetermined region need not be set in a bone image, and local information about the density of the trabeculae of the bone can be obtained accurately from the bone image.

The present invention provides a first method for obtaining information about interstitial patterns of the lungs from an image signal representing a radiation image of the lungs as an object, comprising the steps of:

i) for each of picture elements in the radiation image, rotating a predetermined basic Wavelet function on the radiation image and changing a degree of contraction of the basic Wavelet function within a predetermined range of the degree of contraction, whereby Wavelet transformation is carried out on the image signal, a group of values of a Wavelet transformation factor being thereby calculated for each of the picture elements in the radiation image, ii) calculating a temporary representative value of the group of the values of the Wavelet transformation factor, which have been obtained for each of the picture elements in the radiation image when the degree of contraction of the basic Wavelet function was fixed at a predetermined value and the basic Wavelet function was thereby rotated on the radiation image, the calculation of the temporary representative value being made for each of the values of the degree of contraction of the basic Wavelet function, iii) for each of the picture elements in the radiation image, determining a representative value from a plurality of the temporary representative values, which have been calculated for the values of the degree of contraction of the basic Wavelet function, and iv) for each of the picture elements in the radiation image, rating the interstitial patterns of the lungs in accordance with the determined representative value and the value of the degree of contraction of the basic Wavelet function, which contraction degree value was employed in the Wavelet transformation when the representative value was determined, the results of the rating being thereafter fed out as an output.

The present invention also provides a second method for obtaining information about interstitial patterns of the lungs, wherein the first method for obtaining information about interstitial patterns of the lungs in accordance with the present invention is modified such that the outputs representing the results of the ratings of the interstitial patterns of the lungs, which outputs have been obtained for the picture elements in the radiation image, are displayed as a lung interstitial pattern image with gray level values or colors.

The present invention further provides a third method for obtaining information about interstitial patterns of the lungs, wherein the second method for obtaining information about interstitial patterns of the lungs in accordance with the present invention is modified such that a region having a predetermined range is set at a desired portion on the lung interstitial pattern image, which is displayed by the second method for obtaining information about interstitial patterns of the lungs in accordance with the present invention, a calculation is made to find a representative value of the outputs representing the results of the ratings, which outputs have been obtained for the picture elements located in the region, and the representative value of the outputs is fed out as the information about the interstitial patterns of the lungs.

The present invention still further provides a first method for obtaining information about density of trabeculae of a bone from an image signal representing a radiation image of an object containing the bone, comprising the steps of:

i) for each of picture elements in the radiation image, rotating a predetermined basic Wavelet function on the radiation image and changing a degree of contraction of the basic Wavelet function within a predetermined range of the degree of contraction, whereby Wavelet transformation is carried out on the image signal, a group of values of a Wavelet transformation factor being thereby calculated for each of the picture elements in the radiation image, ii) calculating a representative value from the group of the values of the Wavelet transformation factor, which have been obtained for each of the picture elements in the radiation image, and iii) obtaining the information about the density of the trabeculae of the bone in accordance with the value of the degree of contraction of the basic Wavelet function, which contraction degree value was employed in the Wavelet transformation when the representative value was calculated.

The present invention also provides a second method for obtaining information about density of trabeculae of a bone, wherein the first method for obtaining information about density of trabeculae of a bone in accordance with the present invention is modified such that the information about the density of the trabeculae of the bone, which information has been obtained for the picture elements in the radiation image, is displayed as a bone trabecula density image with gray level values or colors.

The present invention further provides a third method for obtaining information about density of trabeculae of a bone, wherein the second method for obtaining information about density of trabeculae of a bone in accordance with the present invention is modified such that a region having a predetermined range is set at a desired portion on the bone trabecula density image, which is displayed by the second method for obtaining information about density of trabeculae of a bone in accordance with the present invention, a calculation is made to find a representative value of the values of the degree of contraction of the basic Wavelet function, which contraction degree values were employed in the Wavelet transformation when the representative values of the groups of the values of the Wavelet transformation factor were obtained for the picture elements located in the region, and the representative value of the values of the degree of contraction of the basic Wavelet function is fed out as the information about the density of the trabeculae of the bone.

How the Wavelet transformation is carried out will be described hereinbelow.

The Wavelet transformation has recently been developed as a frequency analysis method and has heretofore been applied to stereo pattern matching, signal compression, and the like. The Wavelet transformation is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

Figure 6:
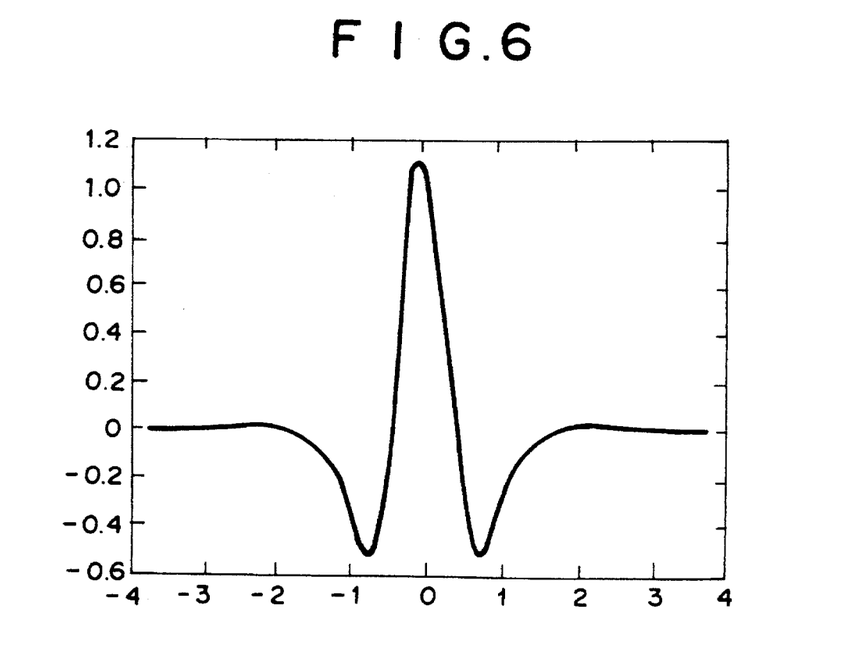
FIG. 6 is a graph showing the basic Wavelet function for Wavelet transformation.

With the Wavelet transformation, a signal is transformed into frequency signals, each being of one of a plurality of different frequency bands, by utilizing a function h, which is shown in FIG. 6, as a basic function and in accordance with the formula $$W(a,b) = \int_{-\infty}^{\infty} f(t)h(a,b)dt \tag{1}$$

wherein f(t): the signal having an arbitrary wave form,

W(a,b): the Wavelet transformation of f(t), $$h(a,b) = \frac{1}{\sqrt{a}} h(at - b)$$

a: the degree of contraction of the function, b: the amount of movement in the horizontal axis direction.

Figure 7:
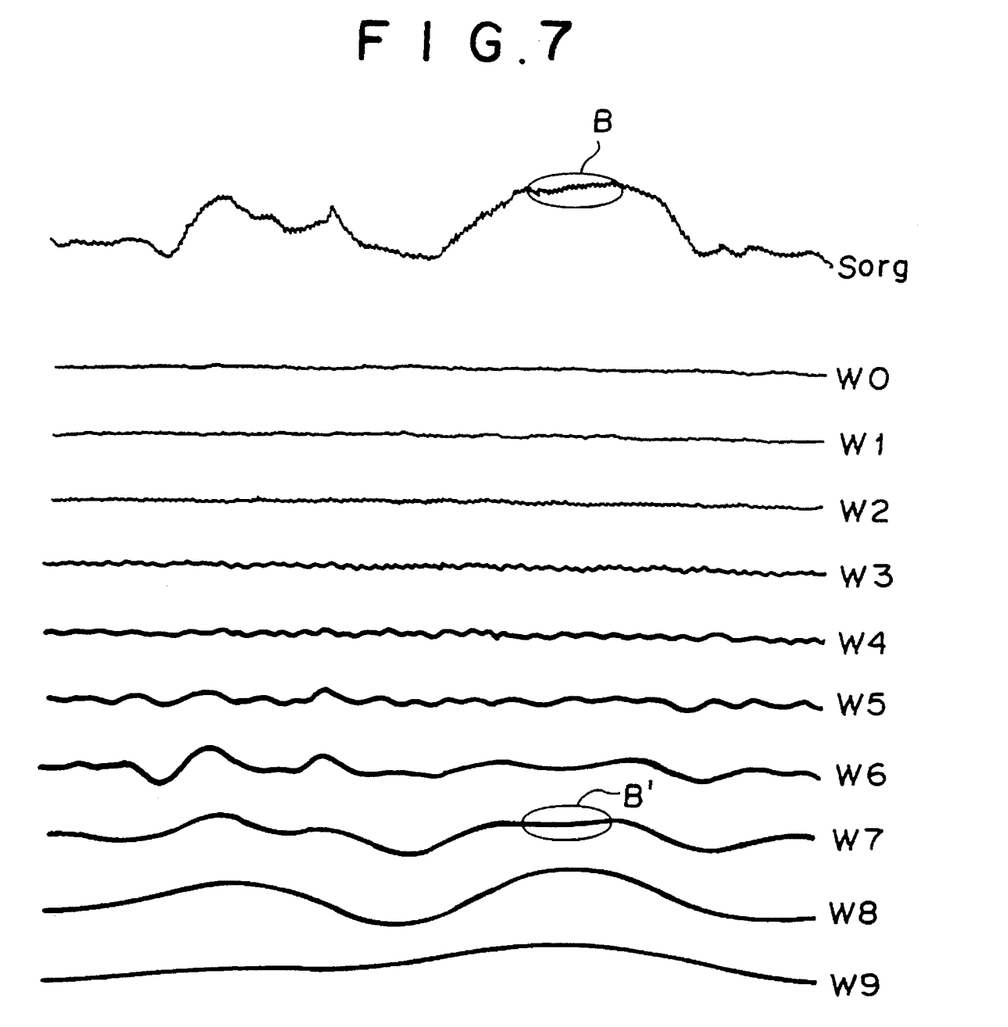
FIG. 7 is a diagram showing signals, which are obtained by carrying out the Wavelet transformation on an original signal Sorg and then carrying out inverse Wavelet transformation for each of frequency bands.
Figure 8:
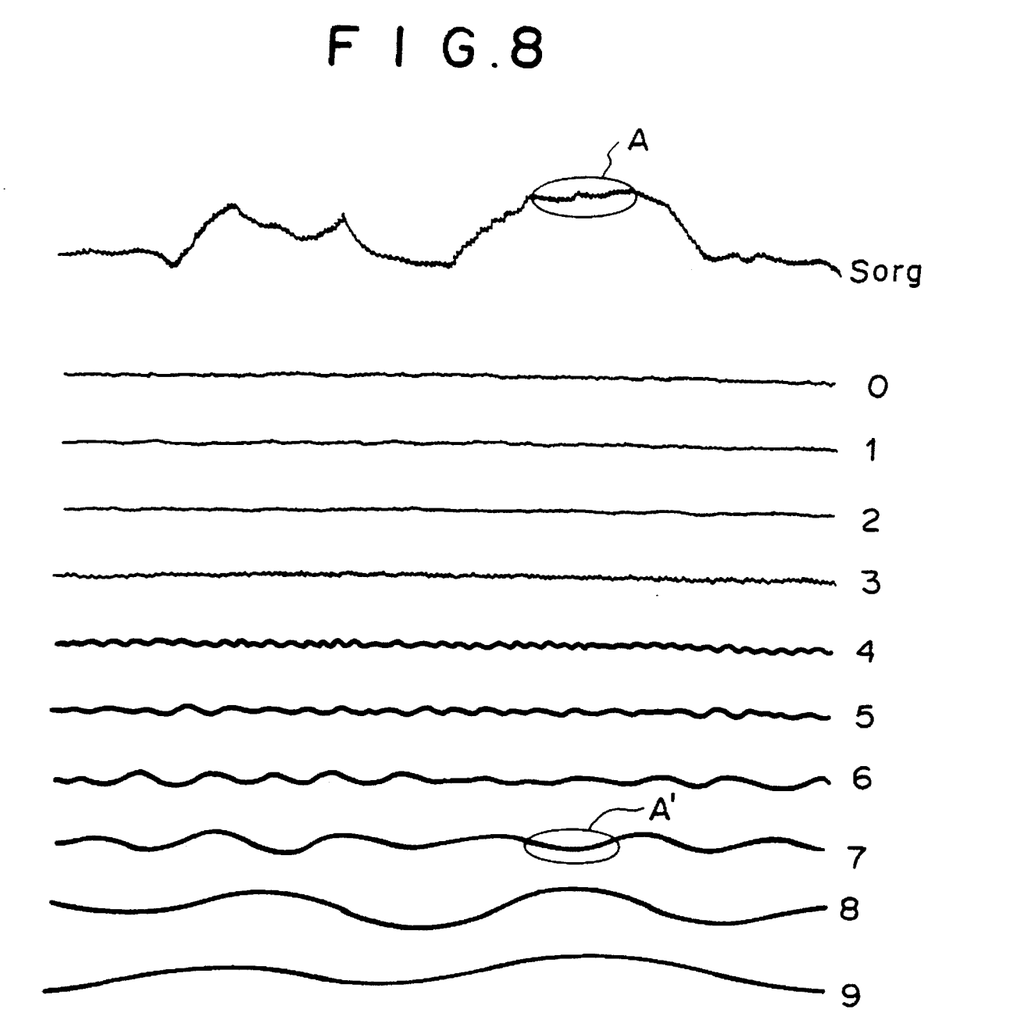
FIG. 8 is a diagram showing signals, which are obtained by carrying out Fourier transformation on the original signal Sorg and then carrying out inverse Fourier transformation for each of the frequency bands.

Therefore, the problems with regard to a false oscillation, which occurs with Fourier transformation, do not occur. Specifically, when filtering processing is carried out by changing the period and the degree of contraction of the function h and moving the function h on an original signal, frequency signals, each of which is adapted to one of desired frequencies ranging from a fine frequency to a coarse frequency. By way of example, FIG. 7 shows signals, which are obtained by carrying out the Wavelet transformation on an original signal Sorg and then carrying out inverse Wavelet transformation for each of frequency bands. FIG. 8 shows signals, which are obtained by carrying out Fourier transformation on the original signal Sorg and then carrying out inverse Fourier transformation for each of the frequency bands. As will be understood from FIGS. 7 and 8, the Wavelet transformation has the advantage over the Fourier transformation in that a frequency signal of a frequency band corresponding to the oscillation of the original signal Sorg can be obtained. Specifically, with the Fourier transformation, an oscillation occurs in a part A' of a frequency band 7, which corresponds to a part A of the original signal Sorg. However, with the Wavelet transformation, as in the original signal Sorg, no oscillation occurs in a part B' of a frequency band W7, which corresponds to a part B of the original signal Sorg.

With the method for obtaining information about interstitial patterns of the lungs in accordance with the present invention, for each of the picture elements in the radiation image of the lung tissues as an object, the predetermined basic Wavelet function is rotated on the radiation image, the degree of contraction of the basic Wavelet function is changed within a predetermined range, and the Wavelet transformation is thereby carried out on the image signal representing the radiation image. In this manner, a group of values of the Wavelet transformation factor are calculated for each of the picture elements in the radiation image. Specifically, the degrees of coincidence between portions of the radiation image around each of the picture elements and the basic Wavelet function are obtained as the group of the values of the Wavelet transformation factor by rotating the basic Wavelet function and changing the degree of contraction of the basic Wavelet function. In this manner, the values of the Wavelet transformation factor adapted to the directions, in which the densities of the object image portions around each of the picture elements vary, and the values of the densities can be obtained by rotating the basic Wavelet function with respect to each of the picture elements and changing the degree of contraction of the basic Wavelet function within a predetermined range. Also, the values of the Wavelet transformation factor of the radiation image, which is free of noise, i.e. the high frequency components in the radiation image, and the information representing the background, i.e. the low frequency components in the radiation image, can be obtained by limiting the change in the degree of contraction of the basic Wavelet function to the predetermined range.

With the method for obtaining information about interstitial patterns of the lungs in accordance with the present invention, thereafter, a calculation is made to find the temporary representative value of the group of the values of the Wavelet transformation factor, which have been obtained for each of the picture elements in the radiation image when the degree of contraction of the basic Wavelet function was fixed at a predetermined value and the basic Wavelet function was thereby rotated on the radiation image. The calculation of the temporary representative value is made for each of the values of the degree of contraction of the basic Wavelet function. Specifically, the degree of contraction of the basic Wavelet function is fixed with respect to each of the picture elements, and the basic Wavelet function is thereby rotated such that the values of the Wavelet transformation factor with respect to respective directions at the fixed degree of contraction of the basic Wavelet function may be obtained. Thereafter, the temporary representative value, which is representative of the values of the Wavelet transformation factor with respect to respective directions, is calculated. In this manner, adverse effects of the directions of the densities of linear object image portions around each of the picture elements can be eliminated, and the information about the values of the densities around each of the picture elements can be obtained as the temporary representative value regardless of the difference in the value of the Wavelet transformation factor due to the difference in the direction of the density of the linear object image portion. In the manner described above, for each of the picture elements in the radiation image, a plurality of the temporary representative values are obtained for the values of the degree of contraction of the basic Wavelet function.

Thereafter, with the method for obtaining information about interstitial patterns of the lungs in accordance with the present invention, for each of the picture elements in the radiation image, the representative value is determined from the plurality of the temporary representative values, which have been calculated for the values of the degree of contraction of the basic Wavelet function. Specifically, with respect to each of the picture elements in the radiation image, the value of the Wavelet transformation factor corresponding to the value of the degree of contraction, at which the degree of coincidence between the object image portions around each of the picture elements and the basic Wavelet function was highest, is thereby determined for each of the picture elements in the radiation image. Thereafter, for each of the picture elements in the radiation image, the interstitial patterns of the lungs in the radiation image are rated in accordance with the determined representative value and the value of the degree of contraction of the basic Wavelet function, which contraction degree value was employed in the Wavelet transformation when the representative value was determined. Also, the results of the rating is fed out as an output.

In cases where the value of the degree of contraction of the basic Wavelet function, which contraction degree value was employed in the Wavelet transformation when the representative value was determined, is small, it may be judged that the density of the lung interstitial patterns located at the image portions around the corresponding picture element is high. Also, in cases where the value of the degree of contraction of the basic Wavelet function, which contraction degree value was employed in the Wavelet transformation when the representative value was determined, is large, it may be judged that the density of the lung interstitial patterns located at the image portions around the corresponding picture element is low. In this manner, the information about the interstitial patterns of the lungs can be obtained.

Also, with the method for obtaining information about interstitial patterns of the lungs in accordance with the present invention, the information about the interstitial patterns of the lungs may be displayed as a lung interstitial pattern image with gray level values or colors in accordance with the determined representative value and the value of the degree of contraction of the basic Wavelet function, which contraction degree value was employed in the Wavelet transformation when the representative value was determined. In this manner, the interstitial patterns of the lungs can be seen as a visible image.

As described above, with the method for obtaining information about interstitial patterns of the lungs in accordance with the present invention, when the information about the interstitial patterns of the lungs is to be obtained, no region need be set in the radiation image. Therefore, a manual operation for setting a region in the radiation image need not be carried out, and the accuracy, with which the information about the interstitial patterns of the lungs is obtained, can be prevented from becoming low due to a mistake made in the setting of such a region. Also, with the method for obtaining information about interstitial patterns of the lungs in accordance with the present invention, the information about the interstitial patterns of the lungs can be obtained with respect to the entire area of the lung image. Therefore, local analyses of the interstitial patterns of the lungs can be carried out. Further, a particular operation for eliminating the information representing the background in the radiation image need not be carried out, and therefore the time required to carry out the operations can be kept short.

Furthermore, with the method for obtaining information about interstitial patterns of the lungs in accordance with the present invention, the interstitial patterns of the lungs can be displayed as a lung interstitial pattern image with gray level values or colors in accordance with the differences in the values of the degree of contraction of the basic Wavelet function. Therefore, the severity of a disease in the lung fields can be investigated easily.

With the method for obtaining information about density of trabeculae of a bone in accordance with the present invention, for each of the picture elements in the radiation image of an object containing the bone, the predetermined basic Wavelet function is rotated on the radiation image, the degree of contraction of the basic Wavelet function is changed within a predetermined range, and the Wavelet transformation is thereby carried out on the image signal representing the radiation image. In this manner, a group of values of the Wavelet transformation factor are calculated for each of the picture elements in the radiation image. Specifically, the degrees of coincidence between portions of the radiation image around each of the picture elements and the basic Wavelet function are obtained as the group of the values of the Wavelet transformation factor by rotating the basic Wavelet function and changing the degree of contraction of the basic Wavelet function. In this manner, the values of the Wavelet transformation factor adapted to the directions, in which the densities of the object image portions around each of the picture elements vary, and the values of the densities can be obtained by rotating the basic Wavelet function with respect to each of the picture elements and changing the degree of contraction of the basic Wavelet function within a predetermined range. Also, with the method for obtaining information about density of trabeculae of a bone in accordance with the present invention, wherein the change in the degree of contraction of the basic Wavelet function is limited to the predetermined range, the Wavelet transformation is not carried out with respect to noise, i.e. the high frequency components, in the radiation image, and the information representing the background, i.e. the low frequency components, in the radiation image. Therefore, the values of the Wavelet transformation factor of the radiation image, which is free of noise and the information representing the background, can be obtained.

With the method for obtaining information about density of trabeculae of a bone in accordance with the present invention, thereafter, the representative value is calculated from the group of the values of the Wavelet transformation factor, which have been obtained for each of the picture elements in the radiation image. Specifically, with respect to each of the picture elements in the radiation image, the value of the Wavelet transformation factor corresponding to the value of the degree of contraction, at which the degree of coincidence between the object image portions around each of the picture elements and the basic Wavelet function was highest, is thereby determined for each of the picture elements in the radiation image. Thereafter, the information about the density of the trabeculae of the bone is obtained in accordance with the value of the degree of contraction of the basic Wavelet function, which contraction degree value was employed in the Wavelet transformation when the representative value was calculated.

In cases where the value of the degree of contraction of the basic Wavelet function, which contraction degree value was employed in the Wavelet transformation when the representative value was determined, is small, it may be judged that the density of the trabeculae of the bone located at the image portions around the corresponding picture element is high. Also, in cases where the value of the degree of contraction of the basic Wavelet function, which contraction degree value was employed in the Wavelet transformation when the representative value was determined, is large, it may be judged that the density of the trabeculae of the bone located at the image portions around the corresponding picture element is low. In this manner, the information about the density of the trabeculae of the bone can be obtained.

Also, with the method for obtaining information about density of trabeculae of a bone in accordance with the present invention, the information representing the density of the trabeculae of the bone, which information has been obtained for the picture elements in the radiation image, may be displayed as a bone trabecula density image with gray level values or colors in accordance with the value of the degree of contraction of the basic Wavelet function, which contraction degree value was employed in the Wavelet transformation when the representative value was calculated for each of the picture elements in the radiation image. In this manner, the density of the trabeculae of the bone can be viewed as a visible image.

As described above, with the method for obtaining information about density of trabeculae of a bone in accordance with the present invention, when the information about the density of the trabeculae of the bone is to be obtained, no region need be set in the radiation image. Therefore, a manual operation for setting a region in the radiation image need not be carried out, and the accuracy, with which the information about the density of the trabeculae of the bone is obtained, can be prevented from becoming low due to a mistake made in the setting of such a region. Also, with the method for obtaining information about density of trabeculae of a bone in accordance with the present invention, the information about the density of the trabeculae of the bone can be obtained with respect to the entire area of the bone image. Therefore, local analyses of the density of the trabeculae of the bone can be carried out.

Further, with the method for obtaining information about density of trabeculae of a bone in accordance with the present invention, the density of the trabeculae of the bone can be displayed as a bone trabecula image with gray level values or colors in accordance with the differences in the values of the degree of contraction of the basic Wavelet function. Therefore, the level of the density of the trabeculae of the bone can be investigated easily.

DESCRIPTION OF THE PREFERRED EMBODIMENTS

The present invention will hereinbelow be described in further detail with reference to the accompanying drawings.

First, embodiments of the method for obtaining information about interstitial patterns of the lungs in accordance with the present invention will be described hereinbelow.

Figure 1:
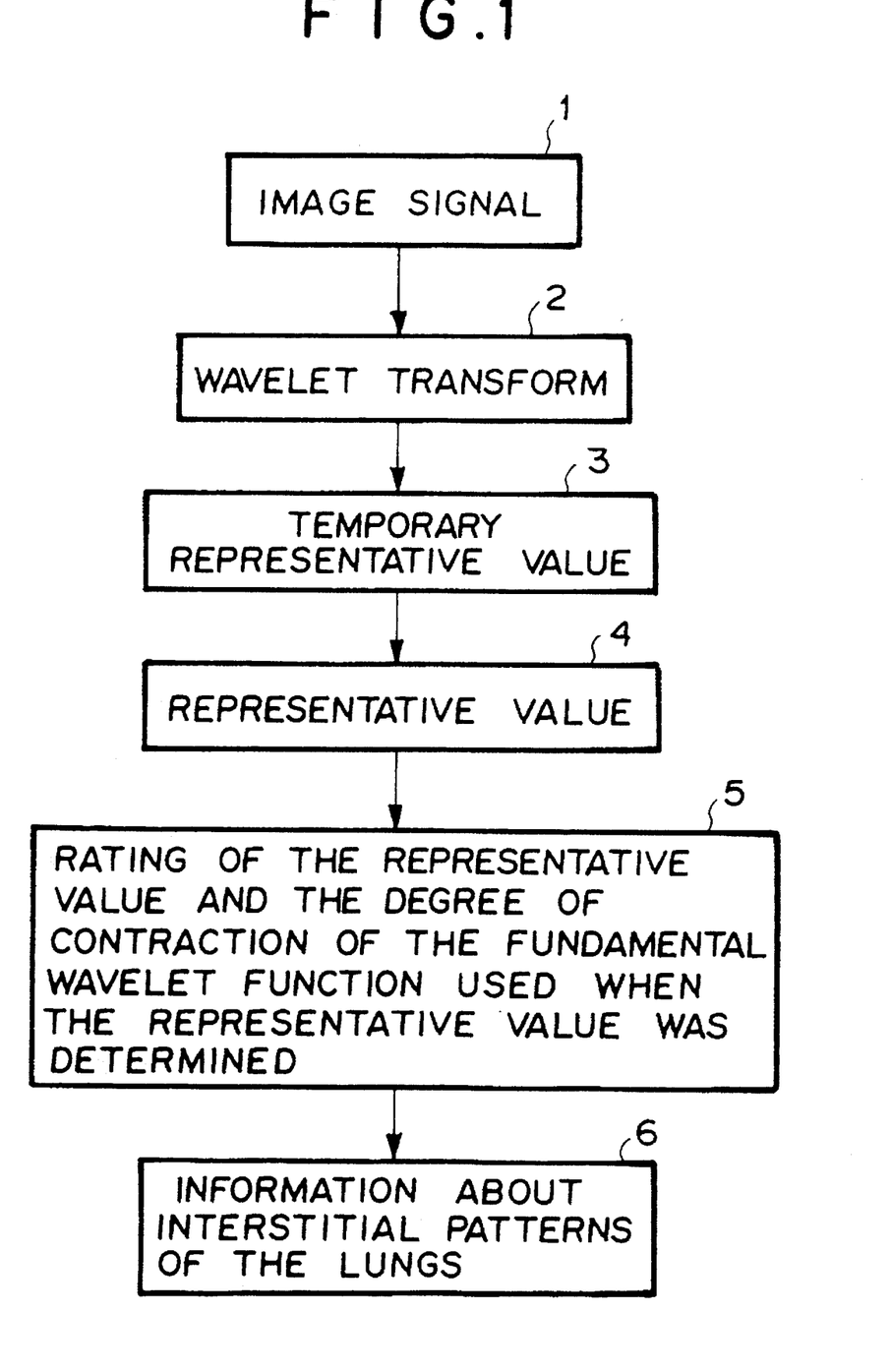
FIG. 1 is a block diagram showing the fundamental concept behind the method for obtaining information about interstitial patterns of the lungs in accordance with the present invention.

FIG. 1 is a block diagram showing the fundamental concept behind the method for obtaining information about interstitial patterns of the lungs in accordance with the present invention.

As illustrated in FIG. 1, in the method for obtaining information about interstitial patterns of the lungs in accordance with the present invention, an image signal representing a radiation image of the lungs as an object is obtained in a step 1. Thereafter, in a step 2, for each of picture elements in the radiation image, a predetermined basic Wavelet function is rotated on the radiation image, a degree of contraction of the basic Wavelet function is changed within a predetermined range, and Wavelet transformation is thereby carried out on the image signal. In this manner, a group of values of a Wavelet transformation factor are calculated for each of the picture elements in the radiation image. In a step 3, a calculation is made to find a temporary representative value of the group of the values of the Wavelet transformation factor, which have been obtained for each of the picture elements in the radiation image when the degree of contraction of the basic Wavelet function was fixed at a predetermined value and the basic Wavelet function was thereby rotated on the radiation image. The calculation of the temporary representative value is made for each of the values of the degree of contraction of the basic Wavelet function. Then, in a step 4, for each of the picture elements in the radiation image, a representative value is determined from a plurality of the temporary representative values, which have been calculated for the values of the degree of contraction of the basic Wavelet function. In a step 5, for each of the picture elements in the radiation image, rating is carried out as to the determined representative value and the value of the degree of contraction of the basic Wavelet function, which contraction degree value was employed in the Wavelet transformation when the representative value was determined. In this manner, in a step 6, information about interstitial patterns of the lungs is obtained.

An embodiment of the method for obtaining information about interstitial patterns of the lungs in accordance with the present invention will hereinafter be described in detail.

Figure 2:
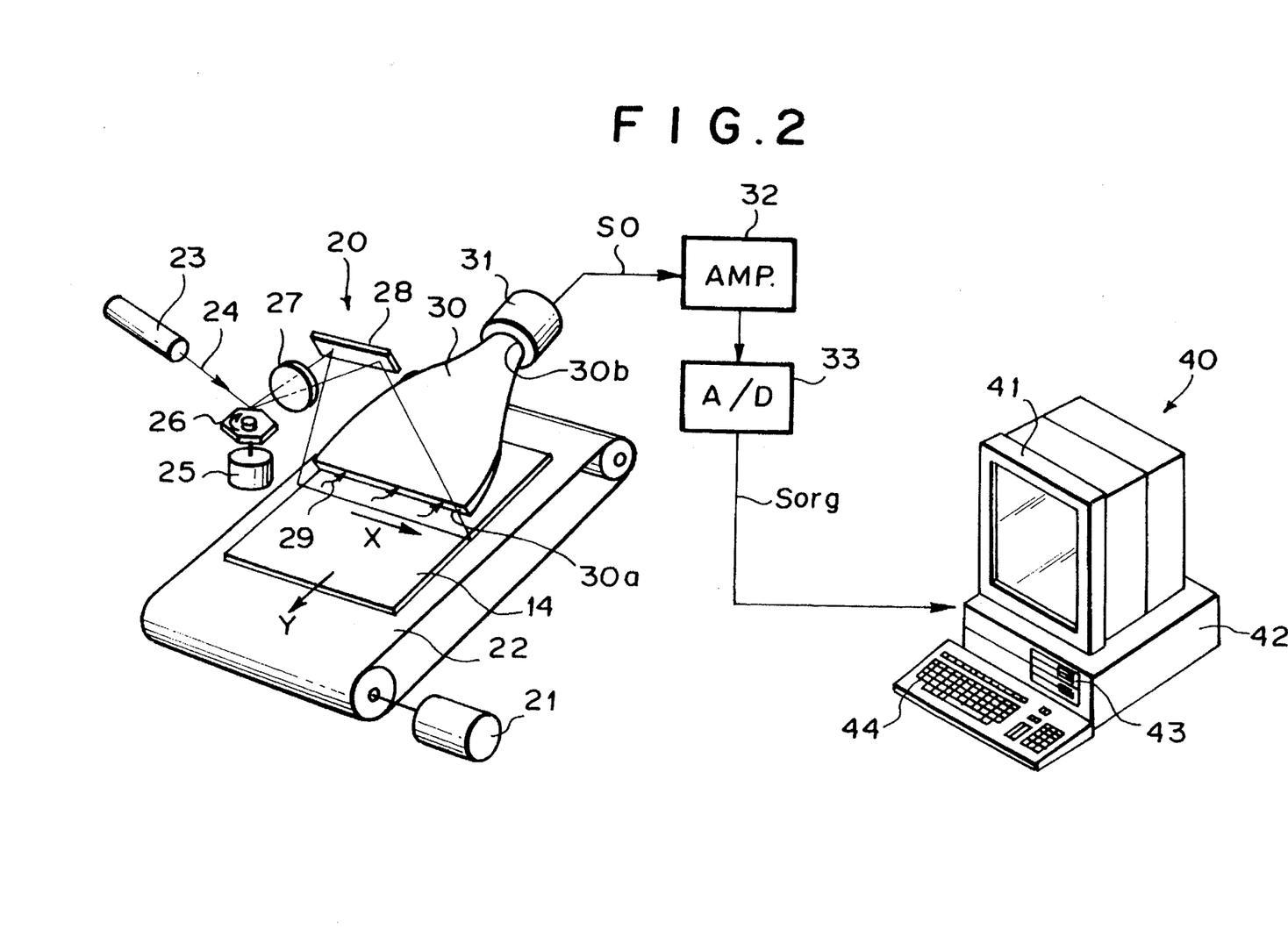
FIG. 2 is a perspective view showing an example of a radiation image read-out apparatus.

FIG. 2 is a perspective view showing an example of a radiation image read-out apparatus.

In a radiation image recording apparatus (not shown), a radiation image is stored on a stimulable phosphor sheet 14. The stimulable phosphor sheet 14, on which the radiation image has been stored, is then set at a predetermined position in a read-out apparatus 20.

After the stimulable phosphor sheet 14, on which the radiation image has been stored, is set at the predetermined position in the read-out apparatus 20, the stimulable phosphor sheet 14 is conveyed in a sub-scanning direction indicated by the arrow Y by an endless belt 22, which is operated by a motor 21. A laser beam 24 is produced by a laser beam source 23 and is reflected and deflected by a rotating polygon mirror 26, which is quickly rotated by a motor 25 in the direction indicated by the arrow. The laser beam 24 then passes through a converging lens 27, which may be constituted of an fθ lens, or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to radiation. The emitted light 29 is guided by a light guide member 30 and photoelectrically detected by a photomultiplier 31. The light guide member 30 is made from a light guiding material, such as an acrylic plate, and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the radiation image, is converted into an electric signal by the photomultiplier 31.

An analog output signal SO generated by the photomultiplier 31 is logarithmically amplified by a logarithmic amplifier 32 and digitized by an A/D converter 33 into an image signal Sorg. The image signal Sorg is then fed into an image processing unit 40. The image processing unit 40 comprises a CRT display device 41 which reproduces and displays a visible image, a main body 42 in which a CPU, an internal memory, interfaces, and the like, are incorporated, a floppy disk drive unit 43 which operates a floppy disk, and a keyboard 44 from which necessary instructions, or the like, are fed into the image processing unit 40.

In the image processing unit 40, the information about the interstitial patterns of the lungs is obtained in the manner described below.

First, the Wavelet transformation is carried out on the image signal Sorg by using a predetermined basic Wavelet function. Specifically, an x axis is set along the main scanning direction on the radiation image. Also, a y axis is set along the sub-scanning direction on the radiation image. The coordinates of each of picture elements in the radiation image are represented by (x,y), and the value of the image signal component representing each of the picture elements is represented by S(x,y). In such cases, the Wavelet transformation is carried out with Formula (2)

$$T(a,r,Vb) = \frac{1}{a} \int S(x,y) \cdot h\left(\frac{r(x,y) - Vb}{a}\right) d(x,y) \qquad (2)$$

wherein $$r = \begin{pmatrix} \cos\theta & -\sin\theta \\ \sin\theta & \cos\theta \end{pmatrix}$$

Vb represents the vector b, which represents the amount of movement on the x-y plane, a represents the degree of contraction of the function h(x,y), and T(a,r,Vb) represents the Wavelet transformation factor.

Figure 3:
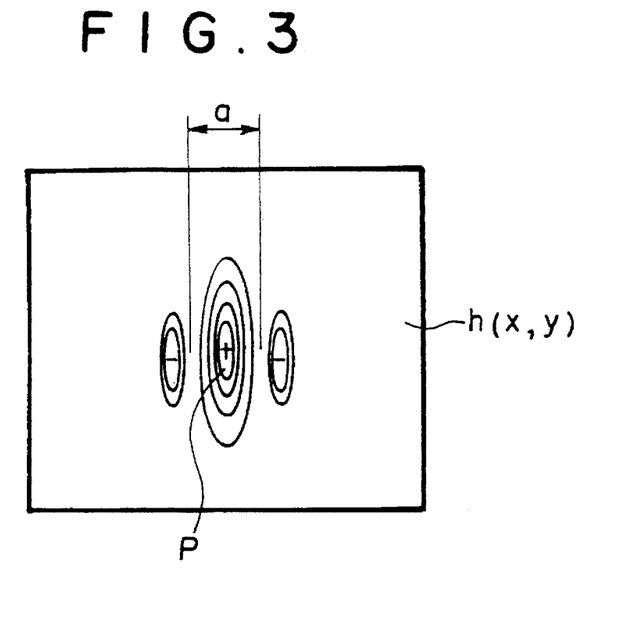
FIG. 3 is an explanatory view showing a basic Wavelet function.

The function h(x,y) is expressed by level lines as shown in FIG. 3. With respect to each of the picture elements in the radiation image, the function h(x,y) is rotated with the parameter r around a point P, the value of the degree of contraction a of the function h(x,y) is changed, and the Wavelet transformation is thereby carried out. From the Wavelet transformation, the degrees of coincidence between the function h(x,y) and the image portions around each picture element having the coordinates (x,y) are obtained as the values of the Wavelet transformation factor T(a,r,Vb), wherein Vb represents the vector b.

First, the value of the degree of contraction a of the function h(x,y) is fixed at a predetermined value, and the function h(x,y) is rotated a total angle of 360 degrees at intervals of, for example, 10 degrees around the point P. Each time the function h(x,y) is rotated an angle of 10 degrees, the Wavelet transformation is carried out with Formula (2). After the function h(x,y) has been rotated one turn, the value of the degree of contraction a of the function h(x,y) is changed to values at predetermined intervals of $2^N$ times the previous value. For each value of the degree of contraction a, the function h(x,y) is rotated, and the Wavelet transformation is carried out with Formula (2). If the value of the degree of contraction a is very small, the values of the Wavelet transformation factor of the radiation image containing noise, i.e. the high frequency components of the radiation image, will be obtained. If the value of the degree of contraction a is very large, the values of the Wavelet transformation factor of the radiation image containing the information representing the background, i.e. the low frequency components of the radiation image, will be obtained. In order for these problems to be eliminated, the value of the degree of contraction a is changed in a range such that it may not coincide with the frequencies of noise and the information representing the background.

In the manner described above, the function h(x,y) is rotated, the value of the degree of contraction a of the function h(x,y) is changed, and the Wavelet transformation is thereby carried out. From the Wavelet transformation, the value of the Wavelet transformation factor T(a,r,Vb) is obtained for each rotation angle and for each value of the degree of contraction a.

Thereafter, a calculation is made to find the mean value of the group of the values of the Wavelet transformation factor, which have been obtained for each of the picture elements in the radiation image when the degree of contraction a of the function h(x,y) was fixed at a predetermined value and the function h(x,y) was thereby rotated various angles on the radiation image. The mean value is represented by $$\underset{r}{AvcT(a,r,Vb)}$$

The mean value is calculated for each of the values of the degree of contraction a of the function h(x,y), which are employed for each of the picture elements in the radiation image. In this manner, a plurality of the mean values of the groups of the values of the Wavelet transformation factor, which groups have been obtained for the respective values of the degree of contraction a employed for each of the picture elements in the radiation image, are calculated. Therefore, even if linear image portions are embedded in the radiation image, adverse effects of the directions of the linear image portions can be eliminated, and the information about the values of the densities around each of the picture elements can be obtained as the mean value regardless of the difference in the value of the Wavelet transformation factor due to the difference in the direction of the density of the linear image portion.

Thereafter, for each picture element having the coordinates (x,y), the maximum value of the mean values, which have been calculated for the values of the degree of contraction a, is calculated. The maximum value is expressed as $$\underset{a\phantom{x}r}{Max}\{AveT(a,r,Vb)\}$$

Each of the mean values is the mean value of the group of the values of the Wavelet transformation factor for each of the values of the degree of contraction a of the basic Wavelet function, which contraction degree values are employed for each of the picture elements in the radiation image. Therefore, the maximum value of the mean values of the groups of the values of the Wavelet transformation factor, which groups have been calculated for different values of the degree of contraction a, is calculated with respect to each of the picture elements in the radiation image in accordance with the level of the density of the interstitial patterns of the lungs. Specifically, as for an image portion at which the interstitial patterns of the lungs are present densely, the mean value of the group of the values of the Wavelet transformation factor obtained with a small value of the degree of contraction a is calculated as the maximum value. Also, as for an image portion at which the interstitial patterns of the lungs are present sparsely, the mean value of the group of the values of the Wavelet transformation factor obtained with a large value of the degree of contraction a is calculated as the maximum value.

As described above, the Wavelet transformation is carried out by rotating the function h(x,y) with the parameter r. Therefore, even if the interstitial patterns of the lungs in the lung image are not parallel to the x axis or the y axis on the radiation image and are inclined with respect to the x axis or the y axis, the function h(x,y) can follow the inclination of the interstitial patterns of the lungs. Accordingly, the maximum value of the mean values of the groups of the values of the Wavelet transformation factor can be calculated in accordance with the level of the density of the interstitial patterns of the lungs and regardless of the inclination of the interstitial patterns of the lungs.

Figure 4:
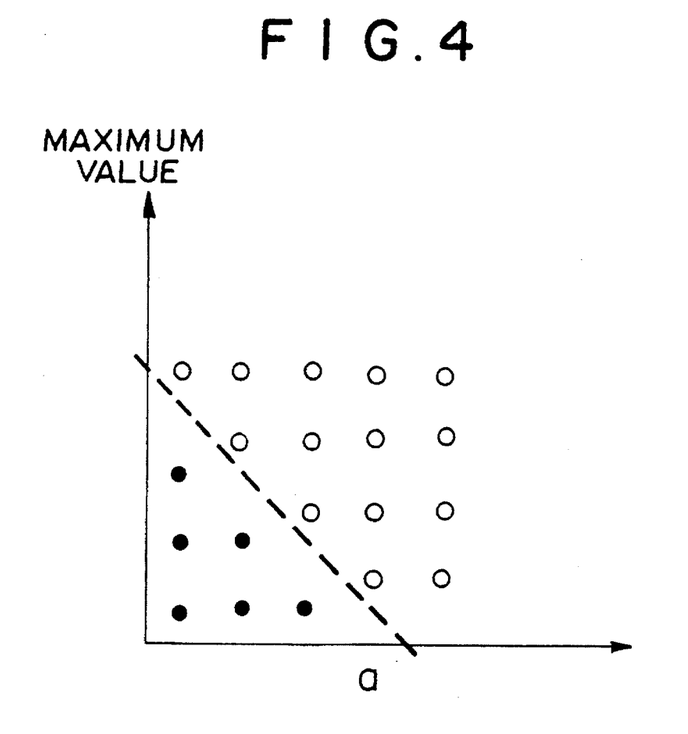
FIG. 4 is a graph showing the relationship between a degree of contraction of the basic Wavelet function and a Wavelet transformation factor.

Therefore, the relationship between the maximum value, which has been calculated in the manner described above, and the value of the degree of contraction a of the function h(x,y), which contraction degree value was employed in the Wavelet transformation when the maximum value was calculated, is investigated. FIG. 4 is a graph showing the relationship between the value of the degree of contraction a and the maximum value. In the graph of FIG. 4 showing the relationship between the value of the degree of contraction a and the maximum value, the region indicated by the white circles indicates an abnormal state, and the region indicated by the black dots indicates the normal state. Specifically, in cases where the value of the degree of contraction a is large and the maximum value is comparatively large, the interstitial patterns of the lungs are in an abnormal state. In cases where the value of the degree of contraction a is small and the maximum value is comparatively small, the interstitial patterns of the lungs are in the normal state. Therefore, for every picture element in the radiation image, the relationship between the value of the degree of contraction a and the maximum value is plotted on the graph shown in FIG. 4. If the plotted point is located in the region indicated by the white circles, it may be judged that the portion corresponding to the plotted point is in an abnormal state. If the plotted point is located in the region indicated by the black dots, it may be judged that the portion corresponding to the plotted point is in the normal state.

Rating of the interstitial patterns of the lungs is carried out in the manner described above. Therefore, a predetermined region need not be set in the radiation image. Accordingly, the accuracy, with which the information about the interstitial patterns of the lungs is obtained, can be prevented from becoming low due to a mistake made in the setting of such a region. Also, the information about the interstitial patterns of the lungs can be viewed easily, and the severity of a disease in the lung fields can be investigated easily.

Figure 5:
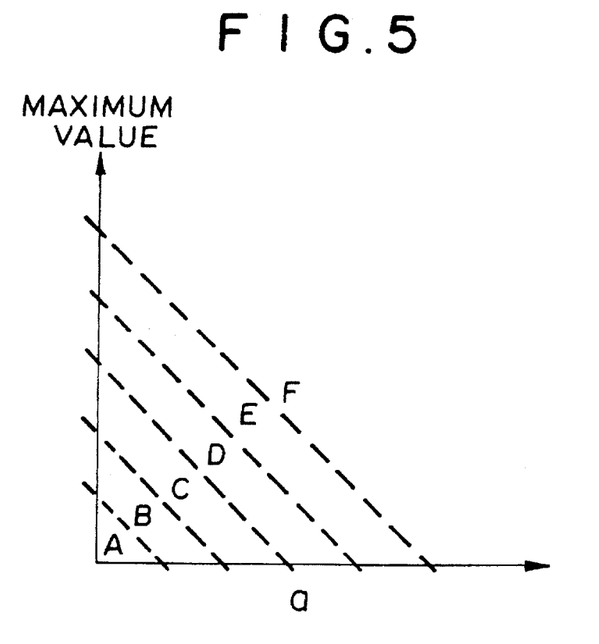
FIG. 5 is a graph showing the relationship between a degree of contraction of the basic Wavelet function and a Wavelet transformation factor.

Also, the interstitial patterns of the lungs can be expressed as levels of image density in accordance with the results of the plotting on the graph. Specifically, as illustrated in FIG. 5, a plurality of regions A, B, C, D, E, and F are set on the graph showing the relationship between the value of the degree of contraction a and the maximum value. Thereafter, the relationship between the calculated maximum value and the corresponding value of the degree of contraction a is plotted on the graph. Rating is then made as to whether the plotted point falls within the region A, B, C, D, E, or F. The lowest image density is assigned to the region A, the highest image density is assigned to the region F, and intermediate levels of image density are assigned to the regions B, D, E, and E. In this manner, for each picture element having the coordinates (x,y), the level of the image density corresponding to the region, in which the corresponding relationship between the value of the degree of contraction a and the maximum value was plotted, is set. The levels of the image density, which have thus been set for the picture elements in the radiation image, are displayed as a lung interstitial pattern image. In the lung interstitial pattern image, a portion in which the interstitial patterns of the lungs are in an abnormal state is indicated by a high level of image density, and a portion in which the interstitial patterns of the lungs are in the normal state is indicated by a low level of image density. Therefore, the normal state and the abnormal state of the interstitial patterns of the lungs can be displayed as the levels of image density.

As described above, the state of the interstitial patterns of the lungs can be displayed with image density values on a visible image, and the interstitial patterns of the lungs in the entire area of the radiation image can be viewed. Therefore, local interstitial patterns of the lungs can be investigated from the information representing the entire area of the radiation image.

In the embodiment described above, the information about the interstitial patterns of the lungs is displayed as a gray level image in accordance with the relationship between the maximum value, which has been calculated for each of the picture elements in the radiation image, and the value of the degree of contraction of the basic Wavelet function, which contraction degree value was employed in the Wavelet transformation when the maximum value was calculated. Alternatively, the interstitial patterns of the lungs may be displayed with colors in accordance with the differences in the values of the degree of contraction of the basic Wavelet function.

Specifically, in the graph shown in FIG. 5, blue, green, red, yellow, and so on, may be set in accordance with the distance from the origin, i.e. from the region A towards the region F. The information about the interstitial patterns of the lungs may then be displayed as a lung interstitial pattern image with colors according to the region, in which the relationship between the value of the degree of contraction a and the maximum value was plotted for each picture element having the coordinates (x,y). In this manner, the state of the interstitial patterns of the lungs can be displayed by colors.

After the information about the interstitial patterns of the lungs has been displayed as the lung interstitial pattern image with the gray level values or colors, a region having a predetermined range may be set at a desired portion on the lung interstitial pattern image. A calculation may then be made to find the mean value of the values of the degree of contraction a, which are represented by the levels of image density or the colors in the set region. The mean value thus calculated may then be fed out as a value representing the information about the interstitial patterns of the lungs. In such cases, the interstitial patterns of the lungs are displayed with the gray level values or colors on the lung interstitial pattern image and can be easily ascertained on the lung interstitial pattern image. Therefore, the setting of the region can be carried out accurately.

Also, in the embodiment described above, the Wavelet transformation is carried out by changing the value of the degree of contraction a to values at predetermined intervals. Alternatively, the Wavelet transformation may be carried out by changing the value of the degree of contraction a to continuously varying values.

Further, in the embodiment described above, the mean value of the group of the values of the Wavelet transformation factor is employed as the temporary representative value for each value of the degree of contraction a. Alternatively, the n'th order moment with respect to the rotation parameter may be employed as the temporary representative value.

Furthermore, in the embodiment described above, the maximum value of the mean values of the groups of the values of the Wavelet transformation factor is employed as the representative value, which is representative of the groups of the values of the Wavelet transformation factor for each of the picture elements in the radiation image. Alternatively, the n'th order moment with respect to the degree of contraction a may be employed as the representative value.

Moreover, in the embodiment described above, the mean value of the values of the degree of contraction a, which are represented by the levels of image density or the colors in the region having the predetermined range on the lung interstitial pattern image, is employed as the representative value, which is representative of the levels of image density or the colors in the region. Alternatively, the n'th order moment with respect to the degree of contraction a may be employed as the representative value, which is representative of the levels of image density or the colors in the region.

Embodiments of the method for obtaining information about density of trabeculae of a bone in accordance with the present invention will be described hereinbelow.

Figure 9:
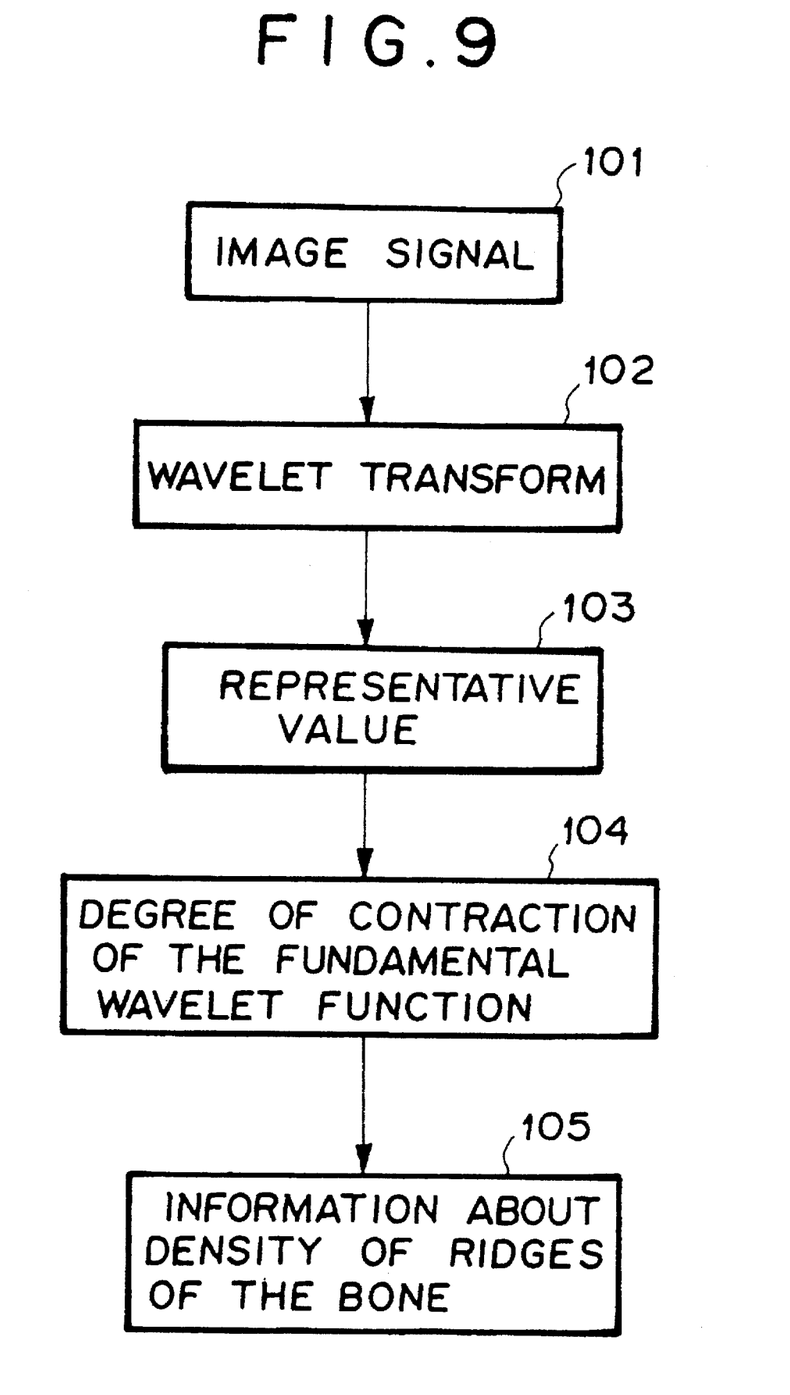
FIG. 9 is a block diagram showing the fundamental concept behind the method for obtaining information about density of trabeculae of a bone in accordance with the present invention.

FIG. 9 is a block diagram showing the fundamental concept behind the method for obtaining information about density of trabeculae of a bone in accordance with the present invention.

As illustrated in FIG. 9, in the method for obtaining information about density of trabeculae of a bone in accordance with the present invention, an image signal representing a radiation image of an object containing a bone is obtained in a step 101. Thereafter, in a step 102, for each of picture elements in the radiation image, a predetermined basic Wavelet function is rotated on the radiation image, a degree of contraction of the basic Wavelet function is changed within a predetermined range, and Wavelet transformation is thereby carried out on the image signal. In this manner, a group of values of a Wavelet transformation factor are calculated for each of the picture elements in the radiation image. In a step 103, for each of the picture elements in the radiation image, a representative value is calculated from the group of the values of the Wavelet transformation factor. In a step 104, the value of the degree of contraction of the basic Wavelet function, which contraction degree value was employed in the Wavelet transformation when the representative value was calculated, is found. Thereafter, in a step 105, the information about the density of the trabeculae of the bone is obtained in accordance with the value of the degree of contraction, which has been found in the step 104.

An embodiment of the method for obtaining information about density of trabeculae of a bone in accordance with the present invention will hereinafter be described in detail.

In a radiation image recording apparatus (not shown), a radiation image is stored on a stimulable phosphor sheet 14. The stimulable phosphor sheet 14, on which the radiation image has been stored, is fed into the radiation image read-out apparatus shown in FIG. 2. The stimulable phosphor sheet 14 is set at a predetermined position in the read-out apparatus 20, and the radiation image is read out from the stimulable phosphor sheet 14 in the same manner as that described above.

An analog output signal SO generated by the photomultiplier 31 is logarithmically amplified by the logarithmic amplifier 32 and digitized by the A/D converter 33 into an image signal Sorg. The image signal Sorg is then fed into the image processing unit 40.

In the image processing unit 40, the information about the density of the trabeculae of the bone is obtained in the manner described below.

First, the Wavelet transformation is carried out on the image signal Sorg by using a predetermined basic Wavelet function. Specifically, an x axis is set along the main scanning direction on the radiation image. Also, a y axis is set along the sub-scanning direction on the radiation image. The coordinates of each of picture elements in the radiation image are represented by (x,y), and the value of the image signal component representing each of the picture elements is represented by S(x,y). In such cases, the Wavelet transformation is carried out with Formula (2)

$$T(a,r,Vb) = \frac{1}{a} \int S(x,y) \cdot h\left( \frac{r(x,y) - Vb}{a} \right) d(x,y) \quad (2)$$

wherein $$r = \begin{pmatrix} \cos\theta & -\sin\theta \\ \sin\theta & \cos\theta \end{pmatrix}$$

Vb represents the vector b, which represents the amount of movement on the x-y plane, a represents the degree of contraction of the function h(x,y), and T(a,r,Vb) represents the Wavelet transformation factor.

The function h(x,y) is expressed by level lines as shown in FIG. 3. With respect to each of the picture elements in the radiation image, the function h(x,y) is rotated with the parameter r around a point P, the value of the degree of contraction a of the function h(x,y) is changed, and the Wavelet transformation is thereby carried out. From the Wavelet transformation, the degrees of coincidence between the function h(x,y) and the image portions around each picture element having the coordinates (x,y) are obtained as the values of the Wavelet transformation factor T(a,r,Vb), wherein Vb represents the vector b.

First, the function h(x,y) is rotated a total angle of 360 degrees at intervals of, for example, 10 degrees around the point P. Each time the function h(x,y) is rotated an angle of 10 degrees, the Wavelet transformation is carried out with Formula (2) by changing the value of the degree of contraction a of the function h(x,y) to values at predetermined intervals of $2^N$ times the previous value. If the value of the degree of contraction a is very small, the values of the Wavelet transformation factor of the radiation image containing noise, i.e. the high frequency components of the radiation image, will be obtained. If the value of the degree of contraction a is very large, the values of the Wavelet transformation factor of the radiation image containing the information representing the background, i.e. the low frequency components of the radiation image, will be obtained. In order for these problems to be eliminated, the value of the degree of contraction a is changed in a range such that it may not coincide with the frequencies of noise and the information representing the background.

In the manner described above, the function h(x,y) is rotated, the value of the degree of contraction a of the function h(x,y) is changed, and the Wavelet transformation is thereby carried out. From the Wavelet transformation, the value of the Wavelet transformation factor T(a,r,Vb) is obtained for each rotation angle and for each value of the degree of contraction a.

Thereafter, for each picture element having the coordinates (x,y), the maximum value of the values of the Wavelet transformation factor T(a,r,Vb), which have been obtained for the respective rotation angles and for the values of the degree of contraction a, is calculated. The maximum value is expressed as $$\underset{a,r}{Max} T(a,r,Vb)$$

As described above, the function h(x,y) is rotated around the point P, and the value of the degree of contraction a is changed. Therefore, the maximum value of the values of the Wavelet transformation factor, which have been calculated for different values of the degree of contraction a, is calculated with respect to each of the picture elements in the radiation image in accordance with the level of the density of the patterns of the trabeculae of the bone shown in FIGS. 10A, 10B, 10C, 10D, and 10E. Specifically, as for an image portion at which the trabeculae of the bone are present densely, the value of the Wavelet transformation factor obtained with a small value of the degree of contraction a is calculated as the maximum value. Also, as for an image portion at which the trabeculae of the bone are present sparsely, the value of the Wavelet transformation factor obtained with a large value of the degree of contraction a is calculated as the maximum value.

As described above, the Wavelet transformation is carried out by rotating the function h(x,y) with the parameter r. Therefore, even if the longitudinal and transverse patterns of the trabeculae of the bone in the bone image are not parallel to the x axis or the y axis on the radiation image and are inclined with respect to the x axis or the y axis, the function h(x,y) can follow the inclination of the patterns of the trabeculae of the bone. Accordingly, the maximum value of the values of the Wavelet transformation factor can be calculated in accordance with the level of the density of the trabeculae of the bone and regardless of the inclination of the patterns of the trabeculae of the bone.

As described above, the value of the degree of contraction a of the function h(x,y), which contraction degree value was employed in the Wavelet transformation when the maximum value of the values of the Wavelet transformation factor was calculated, is small for an image portion, at which the patterns of the trabeculae of the bone are present densely, and is large for an image portion, at which the patterns of the trabeculae of the bone are present sparsely. Therefore, the value of the image density at each picture element having the coordinates (x,y) may be displayed as a bone trabecula density image in accordance with the value of the degree of contraction a of the function h(x,y), which contraction degree value was employed in the Wavelet transformation when the maximum value of the values of the Wavelet transformation factor was calculated. For example, in cases where the value of the degree of contraction a is small, a large image density value may be employed. In cases where the value of the degree of contraction a is large, a small image density value may be employed. In this manner, a portion at which the trabeculae of the bone are present densely is displayed with a large image density value, and a portion at which the trabeculae of the bone are present sparsely is displayed with a small image density value. Therefore, the level of the density, at which the trabeculae of the bone are present, can be expressed with the level of the image density.

As described above, the levels of the density, at which the trabeculae of the bone are present, can be displayed with image density values on a visible image, and the sparseness and denseness of the patterns of the trabeculae of the bone can be viewed easily.

Also, the levels of the density of the trabeculae of the bone in the entire area of the radiation image can be viewed. Therefore, the level of local density of the trabeculae of the bone can be investigated from the information representing the entire area of the radiation image.

Further, a predetermined region need not be set in the radiation image. Therefore, the accuracy, with which the information about the density of the trabeculae of the bone is obtained, can be prevented from becoming low due to a mistake made in the setting of such a region.

In the aforesaid embodiment of the method for obtaining information about density of trabeculae of a bone in accordance with the present invention, the information about the density of the trabeculae of the bone is displayed as a gray level image in accordance with the value of the degree of contraction of the basic Wavelet function, which contraction degree value was employed in the Wavelet transformation when the representative value for each of the picture elements in the radiation image was calculated. Alternatively, the information about the density of the trabeculae of the bone may be displayed with colors in accordance with the differences in the values of the degree of contraction of the basic Wavelet function.

After the information about the density of the trabeculae of the bone has been displayed as the bone trabecula density image with the gray level values or colors, a region having a predetermined range may be set at a desired portion on the bone trabecula density image. A calculation may then be made to find the mean value of the values of the degree of contraction a, which are represented by the levels of image density or the colors in the set region. The mean value thus calculated may then be fed out as a value representing the information about the density of the trabeculae of the bone. In such cases, the information about the density of the trabeculae of the bone is displayed with the gray level values or colors on the bone trabecula density image, and the level of the density of the trabeculae of the bone can be easily ascertained on the bone trabecula density image. Therefore, the setting of the region can be carried out accurately.

Also, in the aforesaid embodiment of the method for obtaining information about density of trabeculae of a bone in accordance with the present invention, the Wavelet transformation is carried out by changing the value of the degree of contraction a to values at predetermined intervals. Alternatively, the Wavelet transformation may be carried out by changing the value of the degree of contraction a to continuously varying values.

Further, in the aforesaid embodiment of the method for obtaining information about density of trabeculae of a bone in accordance with the present invention, the maximum value of the values of the Wavelet transformation factor is employed as the representative value, which is representative of the values of the Wavelet transformation factor for each of the picture elements in the radiation image. Alternatively, the n'th order moment with respect to the degree of contraction a may be employed as the representative value.

Moreover, in the aforesaid embodiment of the method for obtaining information about density of trabeculae of a bone in accordance with the present invention, the mean value of the values of the degree of contraction a, which are represented by the levels of image density or the colors in the region having the predetermined range on the bone trabecula density image, is employed as the representative value, which is representative of the levels of image density or the colors in the region. Alternatively, the n'th order moment with respect to the degree of contraction a may be employed as the representative value, which is representative of the levels of image density or the colors in the region.

What is claimed is:

1. A method for obtaining information about interstitial patterns of lungs from an image signal comprising picture elements and representing a radiation image of the lungs, said method comprising the steps of:

i) rotating, by a predetermined degree interval, a predetermined basic Wavelet function corresponding to each of said picture elements, and changing a degree of contraction of said basic Wavelet function within a predetermined range to obtain a group of values of a Wavelet transformation factor for each of said picture elements, ii) calculating a temporary representative value of said group of values of said Wavelet transformation factor obtained for each of said picture elements for a particular degree of contraction of said basic Wavelet function within said predetermined range, said temporary representative value being calculated for each degree of contraction within said predetermined range of said basic Wavelet function, iii) selecting, for each of said picture elements, a representative value from a plurality of temporary representative values which have been respectively calculated for each degree of contraction of said basic Wavelet function in step ii), iv) determining, for each of said picture elements, interstitial patterns of the lungs, as normal or abnormal, based upon said representative value and a value of said degree of contraction of said basic Wavelet function employed in the Wavelet transformation when said representative value was determined, and outputting results of said determining step respectively corresponding to each of said picture elements.

2. A method as defined in claim 1, further comprising the step of displaying an output representing said results as a lung interstitial pattern image with one of gray level values and colors.

3. A method as defined in claim 2, further comprising the steps of:

setting a region having a predetermined boundary at a desired portion on said lung interstitial pattern image, calculating a representative value of outputs representing results of said determining step obtained for said picture elements located in said region, and outputting said representative value.

4. (Amended) A method as defined in claim 1, wherein said calculating step comprises the step of determining the mean value of said group of values of said Wavelet transformation factor for each of said picture elements for said particular degree of contraction of said basic Wavelet function.

5. A method as defined in claim 4, wherein said determining step comprises the step of determining a maximum value of a plurality of mean values, which have been calculated for respective values, within said predetermined range, of said degree of contraction of said basic Wavelet function.

6. A method as defined in claim 1, further comprising the step of storing said radiation image on a stimulable phosphor sheet prior to said rotating step.

7. A method as defined in claim 6, further comprising the steps of exposing said stimulable phosphor sheet storing said radiation image to stimulating rays, which cause said stimulable phosphor sheet to emit light in proportion to an amount of energy stored thereon, and photoelectrically detecting said emitted light.

8. A method as defined in claim 7, wherein said exposing step includes the step of emitting a laser beam from a laser source.

9. A method as defined in claim 1, further comprising the step of recording said radiation image on photographic film prior to said rotating step.

10. A method for obtaining information about density of trabeculae of a bone from an image signal comprising picture elements and representing a radiation image of an object containing the bone, said method comprising the steps of:

i) rotating by a predetermined degree interval, a predetermined basic Wavelet function corresponding to each of said picture elements, and changing a degree of contraction of said basic Wavelet function within a predetermined range to obtain a group of values of a Wavelet transformation factor for each of said picture elements, ii) calculating a representative value from said group of values of said Wavelet transformation factor obtained for each of said picture elements; and iii) obtaining said information about said density of the trabeculae of the bone in accordance with a value of said degree of contraction of said basic Wavelet function employed in said Wavelet transformation when said representative value was calculated.

11. A method as defined in claim 10, further comprising the step of displaying said information about said density of the trabeculae of the bone as a bone trabecula density image with one of gray level values and colors.

12. A method as defined in claim 11, further comprising the steps of:

setting a region having a predetermined boundary at a desired portion on said bone trabecula density image, calculating a representative value of values of said degree of contraction of said basic Wavelet function employed in said Wavelet transformation when respective representative values of said groups of values of said Wavelet transformation factor were obtained in step i) for said picture elements located in said region, and outputting said representative value.

13. A method as defined in claim 10, wherein said calculating step comprises the step of determining a maximum value of said group of said values of said Wavelet transformation factor for each of said picture elements.

14. A method as defined in claim 10, further comprising the step of storing said radiation image on a stimulable phosphor sheet prior to said rotating step.

15. A method as defined in claim 14, further comprising the steps of exposing said stimulable phosphor sheet storing said radiation image to stimulating rays, which cause said stimulable phosphor sheet to emit light in proportion to an amount of energy stored thereon, and photoelectrically detecting said emitted light.

16. A method as defined in claim 15, wherein said exposing step includes the step of emitting a laser beam from a laser source.

17. A method as defined in claim 10, further comprising the step of recording said radiation image on photographic film prior to said rotating step.

* * * * *